United States Patent [19]
Petite

[11] Patent Number: 6,028,522
[45] Date of Patent: Feb. 22, 2000

[54] SYSTEM FOR MONITORING THE LIGHT LEVEL AROUND AN ATM

[75] Inventor: Thomas D. Petite, Douglasville, Ga.

[73] Assignee: StatSignal Systems, Inc., Atlanta, Ga.

[21] Appl. No.: 09/172,554

[22] Filed: Oct. 14, 1998

[51] Int. Cl.$^7$ ................................................. G08B 21/00
[52] U.S. Cl. ..................... 340/641; 340/642; 340/573.1;
340/825.06; 340/825.35; 340/521; 340/539;
340/232; 340/635
[58] Field of Search ................................. 340/573.1, 540,
340/641, 642, 825.06, 825.35, 539, 521,
635; 348/232, 383, 211; 725/43

[56] References Cited

U.S. PATENT DOCUMENTS

| | | | |
|---|---|---|---|
| 4,354,181 | 10/1982 | Spletzer | 340/642 |
| 5,057,814 | 10/1991 | Onan et al. | 340/458 |
| 5,061,997 | 10/1991 | Rea et al. | 358/108 |
| 5,091,713 | 2/1992 | Horne et al. | 340/541 |
| 5,253,167 | 10/1993 | Yoshida et al. | 705/43 |
| 5,471,201 | 11/1995 | Cerami et al. | 340/641 |
| 5,589,878 | 12/1996 | Cortjens et al. | 348/211 |
| 5,682,139 | 10/1997 | Pradeep et al. | 340/539 |
| 5,754,227 | 5/1998 | Fukuoka | 348/232 |
| 5,774,052 | 6/1998 | Hamm et al. | 340/540 |

*Primary Examiner*—Benjamin C. Lee
*Attorney, Agent, or Firm*—Thomas, Kayden, Horstemeyer & Risley

[57] ABSTRACT

The present invention is generally directed to a system and method for monitoring the level of light surrounding an automatic teller machine (ATM). In accordance with one aspect of the invention, a system includes a plurality of light sensors disposed in varying locations around the ATM. Preferably, some sensors will be disposed near the ATM, while others will be dispersed at various distances surrounding the ATM, in order to effectively monitor the lighting around the ATM. A circuit is provided within the ATM in communication with the sensors. In addition, a radio frequency (RF) transmitter is disposed within the ATM, and is configured to communicate the status of the sensors to a remotely located receiver. Finally, a receiver is interfaced to a telephone line forming part of a public switched telephone network (PSTN), wherein the receiver is configured to receive the status of the sensors communicated from the RF transmitter and to communicate the status information to a remote system via the PSTN. A method is also provided for monitoring lighting conditions surrounding an automatic teller machine. The method includes the steps of disposing a plurality of light sensors around the ATM and communicating the status of the light sensors from the sensors to a computer within the ATM. The method further includes the step of communicating the status of the light sensors from the ATM to a remote system via a public switched telephone network. In accordance with the preferred embodiment, the last step further includes the step of communicating the status of the light sensors via an RF transmitter from the ATM machine to a remote receiver.

20 Claims, 10 Drawing Sheets

SYSTEM FOR MONITORING THE LIGHT LEVEL AROUND AN ATM

BACKGROUND OF THE INVENTION

1. Field of the Invention

The present invention generally relates to lighting systems, and more particularly to a system for measuring the light level surrounding an automatic teller machine (ATM).

2. Discussion of the Related Art

As is known, in recent years ATM devices have gained wide-spread acceptance and usage, and have become quite prevalent in the banking industry. The use of ATMs enhances customer convenience by providing more banking locations, as well as twenty-four hour banking service. However, the use of ATMs has lead to other problems; most notably, theft. This is particularly true at nighttime usage. Many ATM transactions involve the withdrawal of cash from the ATM device by a customer. Typically, when a customer accesses an ATM device to withdraw cash, he/she exposes his wallet/purse in order to deposit money after the withdrawal. This unnecessarily exposes customers and leaves them extremely vulnerable to a would be thief.

One measure taken to address this security issue has been the increase of lighting provided around ATM devices. Many banking institutions have undertaken this step proactively in order to better secure the safety of their customers. In many other instances, certain minimum lighting standards have been regulated. In this regard, several states have already passed legislation that mandates certain minimum lighting level conditions surrounding ATM devices, and similar legislation is pending in other states. For example, and as of the writing of this application, House Bill 5298 of the Massachusetts House of Representatives proposes a comprehensive ATM physical security proposal, which specifies minimum lighting specifications at an ATM location. Specifically, the lighting specification set forth in House Bill 5298 require a minimum luminous intensity of ten foot candles surrounding the ATM, and a minimum of two foot candles at a distance of fifty feet from the ATM. Similar legislation has already passed in many states and, again, remains pending in other states. In addition, the legislative Acts (or proposed Acts) further often include a requirement regarding security cameras at the site of the ATM.

In the past, banking institutions have either self-supplied, or contracted with, service personnel to ensure the proper operation of lighting systems surrounding ATMs. Such service systems typically involved a person that physically traveled from location to location to inspect the proper working conditions of lighting systems. With many state Legislative Acts now requiring proper operation of lighting systems, (e.g., mandating penalties for failure to sustain adequate lighting) the need becomes ever greater that such lighting systems be maintained in proper working order at all times. One way to achieve this is to provide excess lighting surrounding an ATM device, so that if one or more lights burn out, adequate lighting is still maintained. This generally affords the service personnel enough time to detect and repair any faulty lights before the overall lighting conditions fall below specifications. Another way of maintaining adequate lighting is simply to have the service personnel patrol the ATM sites more frequently, so that only a minimum of time passes before the faulty lighting conditions are discovered. Unfortunately, both of these approaches impose undue costs for implementation.

U.S. Pat. No. 5,774,052 to Hamm et al., discloses a monitoring and alerting system for buildings. More particularly, the '052 patent describes a system that includes one or more light level sensors directed to observe the light level at a selected location. A CPU or controller stores data representing an acceptable light level for a given time schedule. If the light level at the selected area does not reach or maintain the desired light levels, corrective action is taken. By way of specific example, the '052 patent teaches that if the commercial establishment is a bank and the light level is at an ATM, the corrective action taken by the system may temporarily shut down the ATM and illuminate a sign to indicate that the ATM is not open. This would alert customers that they should use other ATM devices, and therefore the threat of theft is reduced. The system of the '052 patent also includes a modem in communication with the CPU to allow the transmission of certain data to a remote location. Specifically, the '052 patent states that "if the condition sensed is a different type of discrepancy, failure of heating, water leak detection, or other emergency, the system includes a modem and telephone communication link to a human monitoring station for instantaneous alerting and to allow corrective action." Such a system, however, requires a direct connection of a telephone line with the ATM device.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system and method for monitoring the level of light in an area (preferable the area surrounding an ATM). In accordance with one aspect of the invention, a system is provided for monitoring the level of light in an area having a plurality of light gauges disposed in varying locations around the area, wherein each light gauge includes a light sensor, a central processing unit, a memory, and a radio frequency (RF) transmitter disposed to intercommunicate among each other. A first light gauge, of the plurality of the light gauges, is configured as a master light gauge, and the remainder of the plurality of light gauges are configured as slave gauges. Each of the slave light gauges may intercommunicate with the master light gauge via the RF transmitters. The master light gauge, however, further includes a telecommunications interface disposed in communication with the microprocessor. The telecommunications interface, which may include a cellular transmitter or a PSTN interface, is configured to communicate information relating to an output value of the photocells of the plurality of light gauges to a central station.

In addition, and in a preferred embodiment, each of the light gauges includes a unique identification code. Thus, in one configuration, the master unit may communicate the identification code of each slave unit to a central system for monitoring. It may also associate with each identification code the status value of the on-board light sensor of each gauge. In an alternative configuration, the master unit may communicate to the central system a single "ok" command to indicate that all light gauges at that area are receiving light levels at or above a specified value. In such an embodiment, the master light gauge may be configured to communicate only the identification number and light sensor status of light gauges that fall below a specified level. This will minimize the communications across the telecommunications link.

In accordance with another aspect of the invention, a system includes a plurality of light sensors disposed in varying locations around the ATM. Preferably, some sensors will be disposed near the ATM, while others will be dispersed at various distances surrounding the ATM, in order to effectively monitor the lighting around the ATM. A circuit is provided within the ATM in communication with the sensors. In addition, a radio frequency (RF) transmitter is disposed within the ATM, and is configured to communicate the status of the sensors to a remotely located receiver. Finally, a receiver is interfaced to a telephone line forming part of a public switched telephone network (PSTN), wherein the receiver is configured to receive the status of the sensors communicated from the RF transmitter and to communicate the status information to a remote system via the PSTN.

In accordance with one embodiment of the present invention, the light monitoring system may be configured to operate only during certain hours, such as the hours that coincide with darkness. Alternatively, the system may be configured to operate twenty four hours a day. Thus, during certain extremely cloudy conditions, the lights surrounding the ATM device may be configured to illuminate. Failure of the lighting system to adequately illuminate the environment surrounding the ATM would result in the inventive system alerting a remote system to dispatch service personnel to repair or otherwise troubleshoot and repair the system. The preferred embodiment may further include a sensor for determining the proper operation of a security camera used to monitor the vicinity of the ATM. If the security camera is determined to malfunction, then this condition may also be reported to the remote system so that appropriate service personnel may be dispatched to remedy the problem.

In accordance with another embodiment of the invention, a similar system is provided for monitoring the level of light surrounding an automatic teller machine (ATM). Like the previous embodiment, this embodiment of the invention includes a plurality of light sensors disposed in varying locations around the ATM, and a circuit within the ATM in communication with the sensors. However, this embodiment of the invention includes a cellular transmitter disposed within ATM for communicating the status of the sensors to a remote cell site, the cellular transmitter being disposed in communication with the circuit. The cell site can then relay this information to the PSTN and on to a central system.

In accordance with yet another embodiment of the invention, a similar system is provided for monitoring the level of light surrounding an automatic teller machine (ATM). Like the previous embodiment, this embodiment of the invention includes a plurality of light sensors disposed in varying locations around the ATM, and a circuit within the ATM in communication with the sensors. However, this embodiment of the invention includes a radio frequency (RF) transceiver disposed within the ATM configured to communicate the status of the sensors to a second, remotely located transceiver. A second transceiver is interfaced to a telephone line forming part of a public switched telephone network (PSTN), wherein the second transceiver is configured to receive a request via the PSTN initiated from a remotely located system to check the status of the light sensors and relay that request to the RF transceiver disposed within the ATM. The second transceiver is further configured to receive the status of the sensors communicated from the RF transceiver, the second transceiver is further configured to communicate the status information to a remote system via the PSTN.

In accordance with another aspect of the invention, a method is provided for monitoring lighting conditions surrounding an automatic teller machine. The method includes the steps of disposing a plurality of light sensors around the ATM and communicating the status of the light sensors from the sensors to a computer within the ATM. The method further includes the step of communicating the status of the light sensors from the ATM to a remote system via a public switched telephone network. In accordance with the preferred embodiment, the last step further includes the step of communicating the status of the light sensors via an RF transmitter from the ATM machine to a remote receiver.

The present invention, as highlighted above, realizes several advantages over prior art approaches and systems. One advantage realized by the system of the present invention relates to portability. In those embodiments that utilize either an RF transmitter or a cellular transmitter, a physical phone line need not be connected to the ATM, and thus a readily portable ATM device may be provided.

Another advantage of the system of the present invention relates to flexibility. By including an identification code within the ATM (and/or within the light meter gauges) that is communicated to the central system, specific identification of malfunctioning lights and/or a service-needy ATM can be readily identified.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Having summarized the invention above, reference is now made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 1:
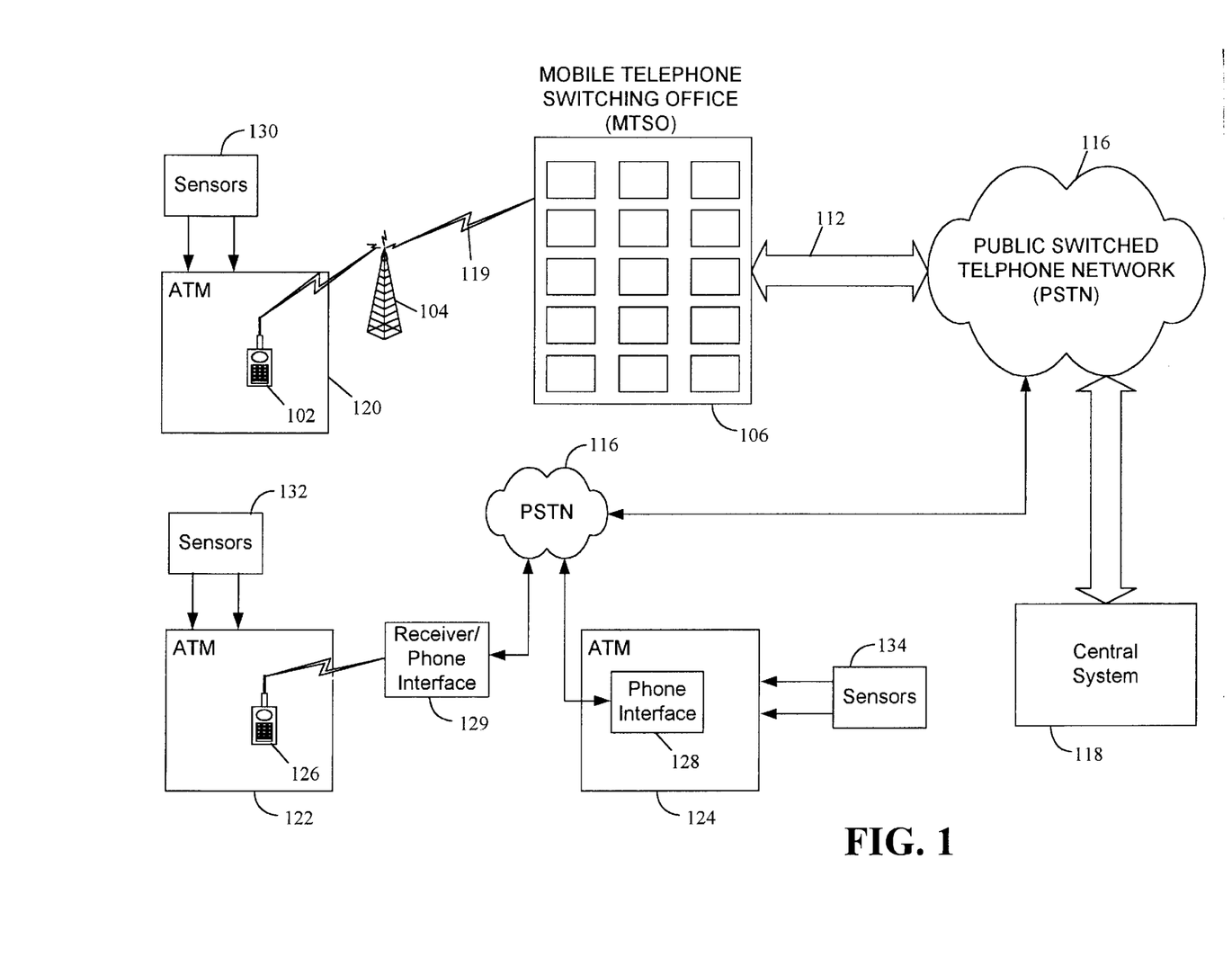
FIG. 1 is a system-level block diagram illustrating differing embodiments and configurations of the present invention surrounding ATMs.

Turning now to the drawings, FIG. 1 shows a top-level block diagram of a light monitoring system constructed in accordance with the invention, and illustrates the interconnection between a cellular telephone system and a switched telephone network (PSTN). By way of background, the Federal Communications Commission (FCC) controls and regulates the cellular communication industry. In this role, it is responsible for granting licenses required to operate cellular systems. The FCC has divided the country into a number of geographic areas, and to encourage competition, the FCC has decreed that there be two telephone carriers in each geographical area. The FCC has further specified that one carrier must be a wire line, or standard telephone service provider, and the other must be a non-wire provider. Cellular carriers provide cellular systems for each geographical area licensed. The cellular systems serve to interconnect a cellular telephone subscriber with another cellular telephone subscriber or with standard telephones.

As shown in FIG. 1, there are three principal parts to a cellular telephone system: cellular subscriber stations (for cellular phones) 102 cellular base stations (or cell sites) 104, and a mobile telephone switching office (MTSO) 106. The subscriber stations 102 are typically standard portable or mobile telephones, each consisting of a standard transceiver, a handset, and antenna. Cellular base stations, or cell sites, 104 are typically dispersed geographically in a reasonably uniform fashion to get the maximum geographic coverage. The geographic region covered by a single cell site 104 is a called a cell. As is known and understood in the art, cell sites 104 will typically be distributed so that a contiguous geographic region is covered and serviced completely by the cellular system. In this regard, each cell will be disposed adjacent a number of other cells, or more specifically, will be surrounded by a number of adjacent cells.

The base stations 104 are responsible for setting up and maintaining calls placed to and from subscriber stations 102 in their respective cells. The cell sites 104 "hand-off" to neighboring cell sites as a subscriber moves from cell to cell. They also communicate call progress with the MTSO 106.

The MTSO 106 is a telephone switching system with network connections to cellular base stations 104 and trunk lines 112 to and from the public switched telephone network (PSTN) 116. The PSTN 116, in turn, connects to standard telephones, such as those existing in residential areas or homes. A principal function of the MTSO 106 is to maintain a database of subscribers and subscriber features, track the progress of calls made to or from subscribers, and record call details for billing purposes. Such cellular billing typically varies from subscriber to subscriber, depending on a number of factors, including a particular package that a subscriber has purchased from the cellular provider.

The MTSO 106 is typically configured to execute at least three principal functions. The first is a switched network management function, which manages the interconnection of subscriber stations 102 and the PSTN 116. The second principal function includes a system control program which provides various functions to maintain a database of subscriber stations. A third principal function of the MTSO 106 is an automated message accounting program, which delivers call records having data for billing purposes.

Having described certain fundamental components in a telecommunications system, reference will now be made to the present invention. As previously mentioned, the present invention relates to a light monitoring system surrounding an ATM. Three different configurations are illustrated in FIG. 1 for communicating light sensor data from an ATM device to a central system 118. Each of these embodiments will be discussed in more detail in connection with FIGS. 2, 3, and 4A.

In a first embodiment, a plurality of sensors 130 are disposed in communication with an ATM 120. The sensors include light level sensors, and may include additional sensors such as sensors for detecting the proper operation of a security camera disposed in connection with the ATM 120. In this first embodiment, a cellular transmitter 102 is also disposed in connection with the ATM 120. The sensor status information is provided to the cellular transmitter, which establishes a communication link via cell site 104, MTSO 106, and PSTN 116 to a central system 118. The central system 118 may include dispatch personnel, which could respond to a condition of low lighting detected by the sensors 130 at the ATM 120 to repair or correct any defective condition sensed. In this regard, the sensors 130 may be configured to, in essence, report a binary state. That is, they may report a first state if the lighting conditions exceed a predetermined minimum threshold, or report a second state if the lighting conditions fail to meet that minimum threshold. Alternatively, the sensors 130 may be configured to quantify and report a precise level of lighting detected at the sensors 130. This information could be monitored at the central system, and if lighting conditions were detected to be on the decline, then the central system 118 could dispatch a service person to check on or service the lighting system at ATM 120.

In a second embodiment, a plurality of sensors 132 are disposed in connection with an ATM 122. This embodiment may be configured similar to the first embodiment, with the exception that the second embodiment does not utilize a cellular transmitter. Instead, an RF transmitter 126 may be configured in place of the cellular transmitter 102. As will be further described below, the RF transmitter 126 may be configured to communicate data via an RF link to a remote (but nearby) receiver 129. The receiver 129 may be disposed in connection with a phone line interface to further communicate the received data across a land-line telephone (i.e., PSTN 116) to the central system 118.

In a third embodiment, sensors 134 may be disposed in connection with an ATM 124, as in the first two embodiments. However, in the third embodiment, a phone interface 128 is provided within the ATM 124. The phone interface 128 provides a direct interface in connection to a land-line telephone (i.e., the PSTN 116) for communication of data directly via the PSTN 116 to the central system 118.

Each of the embodiments briefly described above will be described in more detail in connection with FIGS. 2, 3, and 4A. It will be appreciated, however, that further variations of these systems may be provided consistent with the present invention. Furthermore, the various embodiments may be collectively configured (as shown in FIG. 1) in a single system, which monitors a plurality of ATMs 120, 122, and 124. It will be appreciated that the invention provides a robust and economical system for monitoring light levels surrounding automatic teller machines 120, 122, and 124, whereby upon detection of below specified lighting conditions, service and repair personnel may dispatched immediately to rectify the situation. In this way, lighting provided at various banking facilities may be maintained at safe operating levels, thereby minimizing theft, which may otherwise occur around these banking machines.

Figure 2:
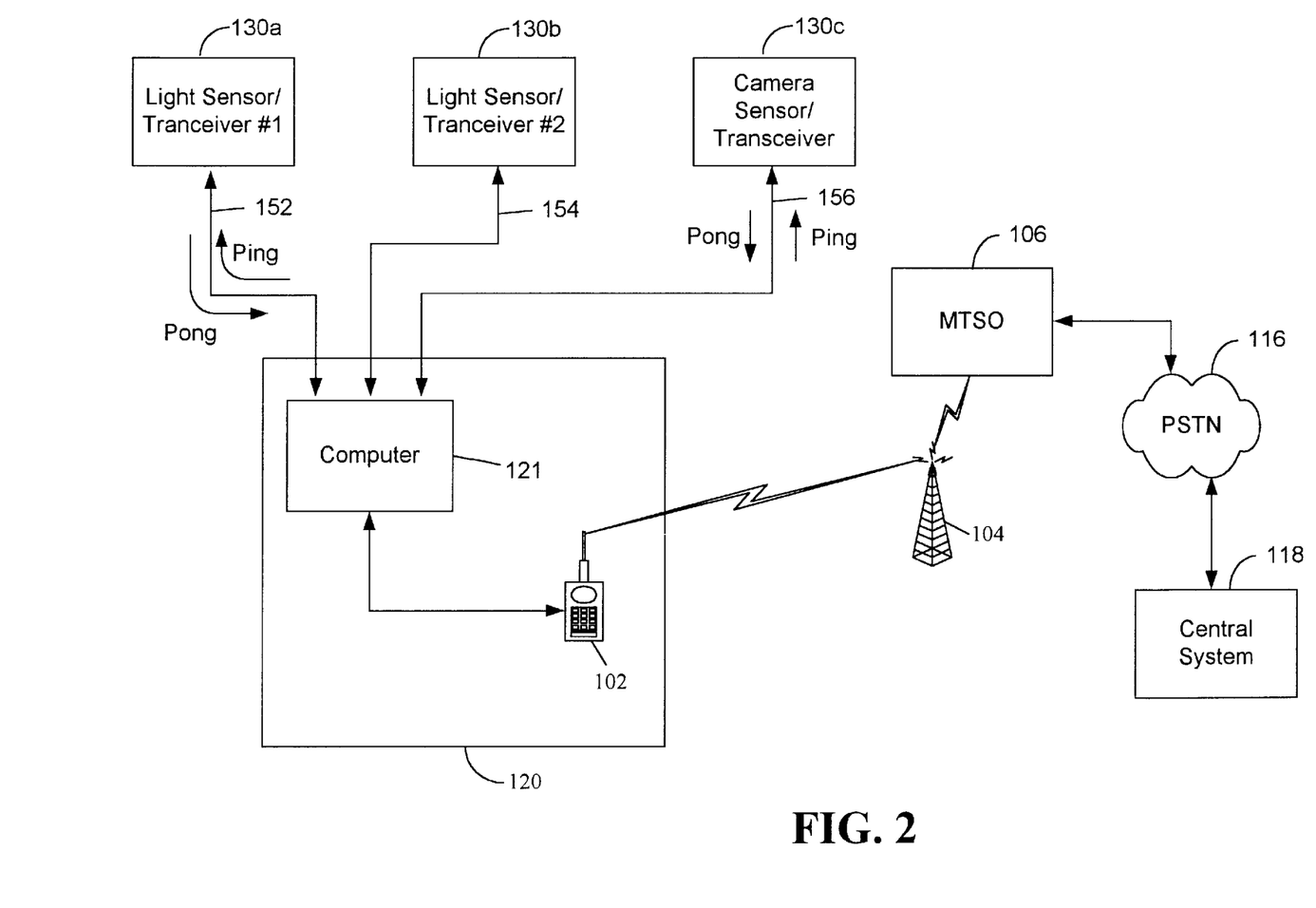
FIG. 2 is a block diagram of one embodiment of the present invention.

Reference is now made to FIG. 2 which shows the first embodiment in more detail. In this regard, the ATM environment is illustrated as having a plurality of sensors 130a, 130b, and 130c. More specifically, a plurality of light level sensors or transceivers 130a and 130b are disposed in communication with a computer 121. Although only two light level sensors 130a and 130b have been illustrated, it will be appreciated that many more may be provided consistent with the concepts of the invention. Similarly, additional security camera sensors 130c, or other operational sensors may be provided. Further, it will be appreciated that the computer 121, for purposes of this application, broadly refers to any processing device, such as an electronic circuit including a microprocessor, microcontroller, a specially configured state machine, or other electronic circuit that is configured to process a sequence of instructions. A camera sensor 130c is also disposed in communication with the computer 121. In accordance with the concepts and teachings of the invention, the sensors 130a, 130b, and 130c may be passive components configured to sense a level of light (or operability of a camera) and report that data to the computer 121 via a direct wire connection. In this regard, the computer 121 may have an interface (not shown) that reads the values on the various signal connections 152, 154, and 156. In one embodiment, the signal connections 152, 154, and 156 may be single wire connections that convey binary information (i.e., logic high or logic low) to reflect whether or not the lighting condition detected by the light sensors 130a and 130b exceeds any lighting specifications. Likewise, the signal line 156 may be a binary signal simply indicating whether the camera monitored by the sensor 130c is operable. Alternatively, the signal connections 152, 154, and 156 may be single wire connections that convey analog information that is received at the ATM 120 by an interface (not shown) that converts the analog values carried on the signal lines into digital values that may be read and processed by the computer 121. Analog signals may convey a spectrum of information, most notably an accurate reading of a precise light level sensed by the sensors 130a and 130b.

In yet a further embodiment, the sensors 130a, 130b, and 130c may comprise transceivers that are capable of either transmitting information to the computer 121 or receiving information from the computer 121. In such an embodiment, the signal connections 152, 154, and 156 may comprise a serial interface, a parallel interface, or other interface to appropriately interconnect the sensors 130a, 130b, and 130c with the computer 121. In this embodiment, the computer 121 may periodically request the status of the sensors 130a, 130b, and 130c. This request/response protocol is illustrated in the figure by the designations Ping (computer request for information) and Pong (sensor's response to the request). The computer 121 may periodically request this information on its own initiative and timing, or may be further responding to requests ultimately made by the central system 118. In this regard, the central system 118 may initiate a request for information about the lighting in a particular ATM 120, whereby this request is initiated over the PSTN 116 and is routed through the MTSO 106. The MTSO 106 may then initiate a call via a cellular link to the cellular transceiver 102 within the ATM 120. The cellular transceiver 102 may then relay this request to the computer 121 which then submits individual requests to the sensors for information. The response (Pong) may then be relayed back through the various links to the central system.

Figure 3:
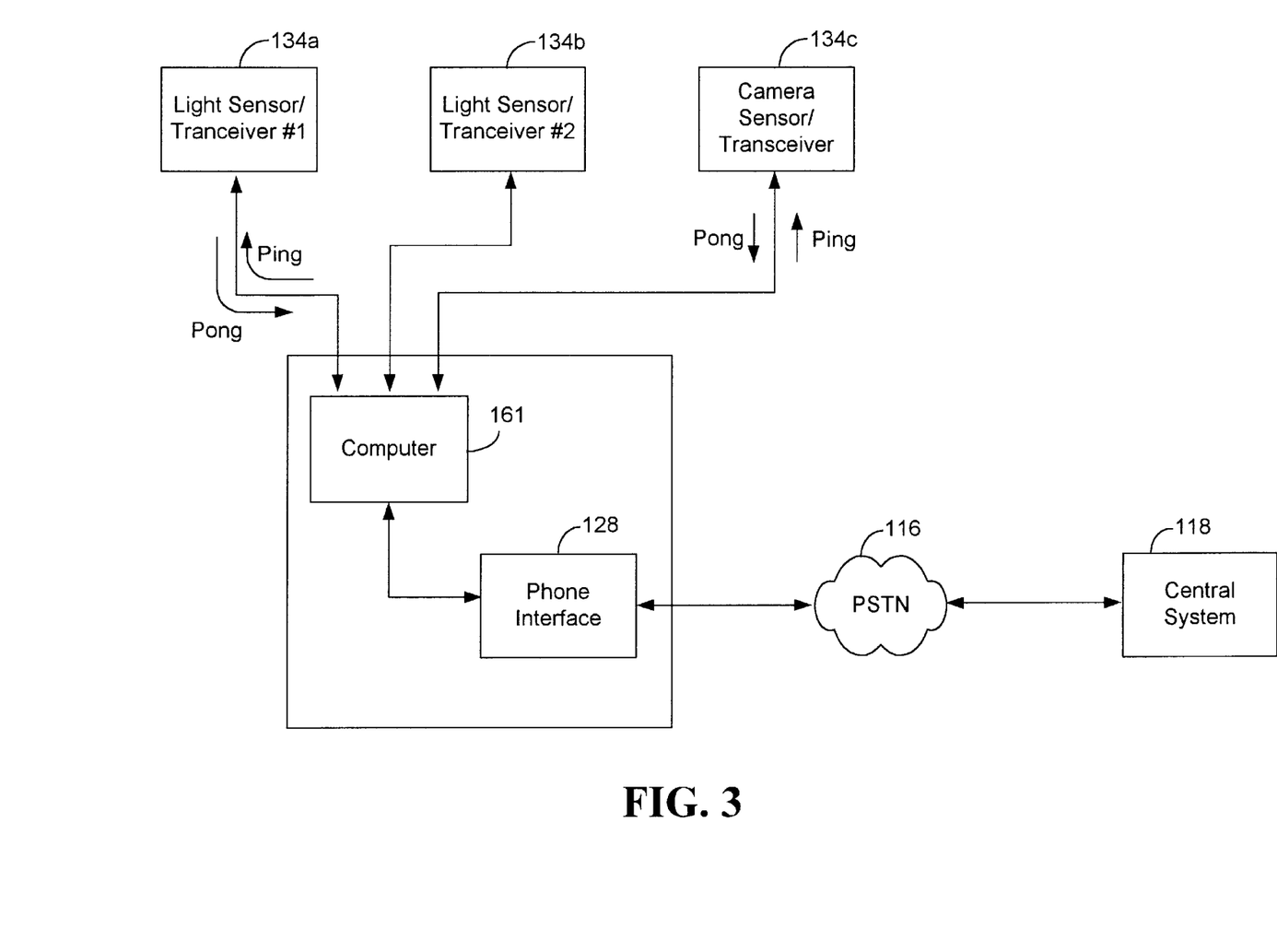
FIG. 3 is a block diagram of a second embodiment of the present invention.

Reference is made now to FIG. 3 which shows an alternative environment for the present invention. In this environment, sensors 134A, 134B, and 134c are provided in connection with an ATM 124. The sensors 134A, 134B, and 134c, and their communication with the computer 161 may be the same as that described in connection with sensors 130a, 130b, and 130c, in computer 121 of FIG. 2, and need not be further described herein. The significant distinction between the environment of FIG. 2 and that of FIG. 3 is that the environment of FIG. 3 communicates directly from the ATM 124 across the PSTN 116 to the central system 118, whereas the environment of FIG. 2 communicate via a cellular link before reaching the PSTN 116. Therefore, in this environment a phone interface 128 is provided in connection with the computer 161 at the ATM 124. This phone interface is designed to interface directly with a telephone line, and thus communicate across the PSTN 116. It is anticipated that this environment will be the most common environment for ATM devices that are provided in connection with a banking facility, and are therefore not subject to move. However, other ATM devices are provided in shopping malls, at restaurants, in grocery stores, and a variety of other facilities where the routing of a telephone line directly to the ATM may not be desirable. In such an environment, the embodiment of FIG. 2 or that of FIG. 4A (which will be discussed below) may be more desirable.

Figure 4A:
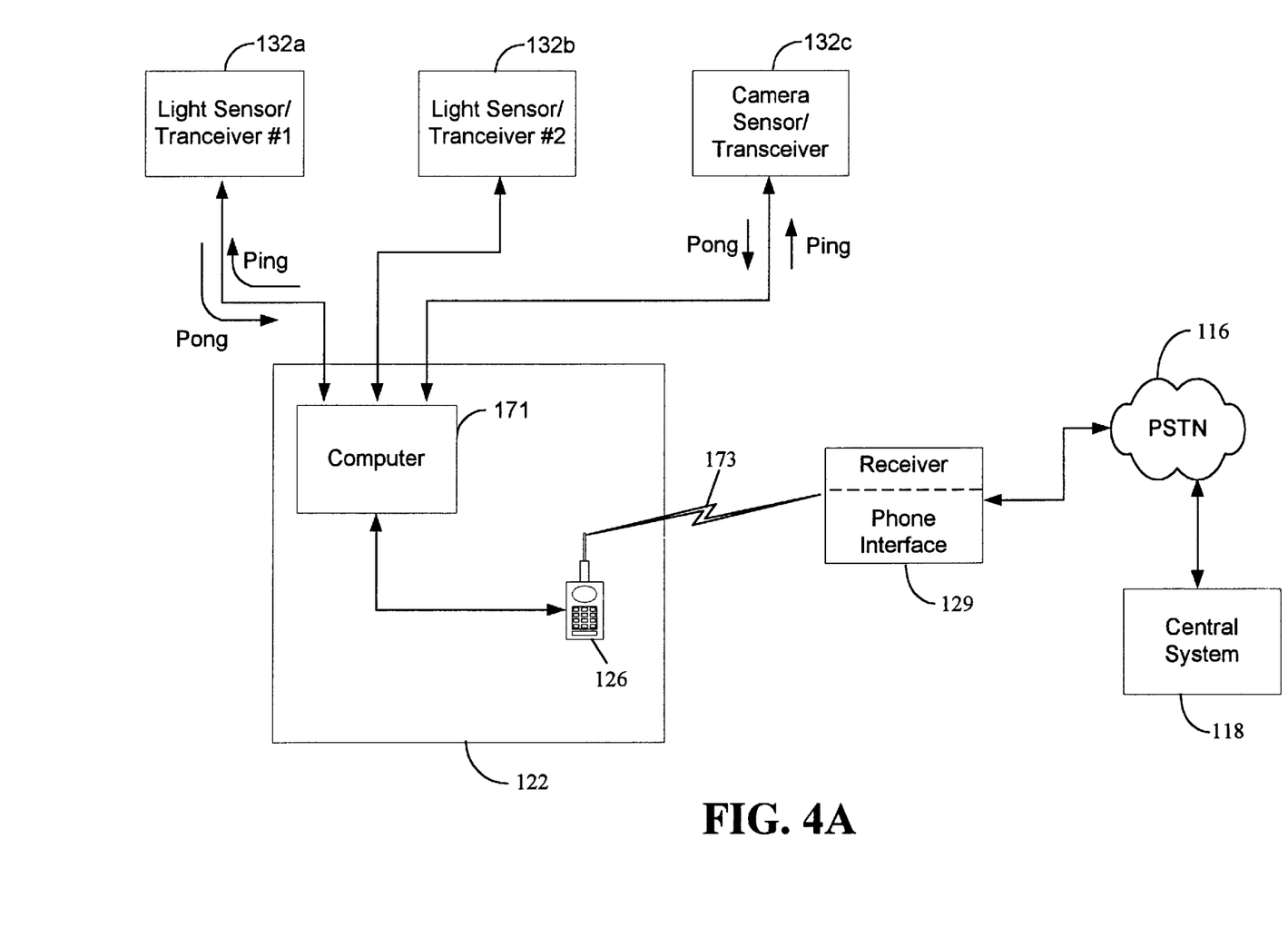
FIG. 4A is a block diagram of a third embodiment of the present invention.

Having said this, reference is now made to FIG. 4A, which shows yet another environment for the present invention. In this environment, sensors 132a, 132b, and 132c, are disposed in communication with a computer 171. Operation of the sensors 132a, 132b, and 132c and a computer 171 will be as described in connection with FIG. 2, and therefore need not be repeated here. The significant difference of the environment of FIG. 4A is that an RF transmitter 126 is provided at the ATM 122 for communicating data to the central system 118. Preferably, the transmitter 126 is a relatively low power RF transmitter that communicates data via an RF link to a nearby receiver 129 that is disposed in connection with a telephone interface, for connection to a telephone line and therefore communication via the PSTN 116. In an alternative embodiment, the RF communication device 126 may be a transceiver capable of bidirectional communication via RF link 173 with a transceiver disposed in communication with a phone interface. This would allow requests from the central system 118 to be made across the PSTN 116 and through the transceiver 126 for status information of the various sensors 132a, 132b, and 132c.

Figure 4B:
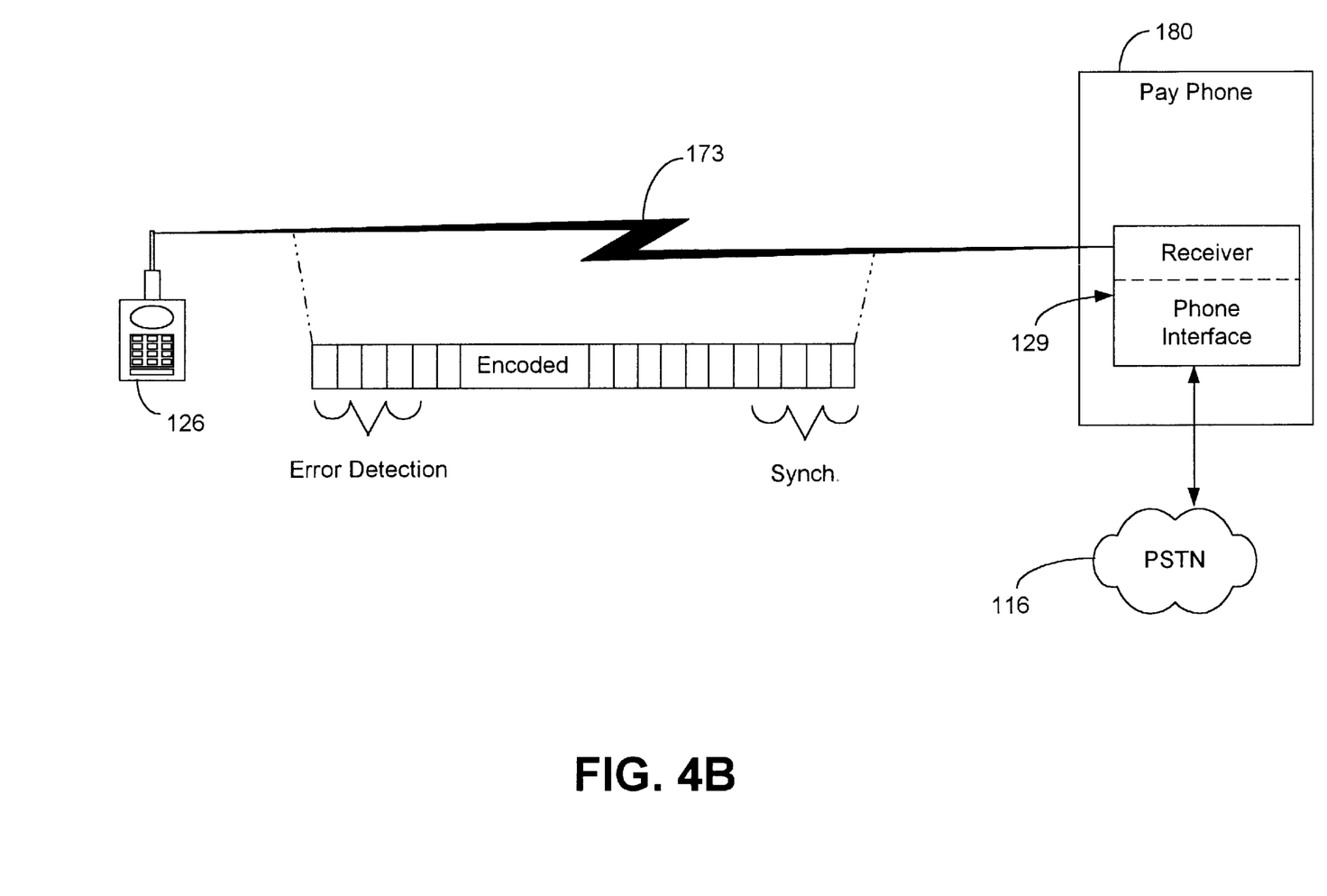
FIG. 4B is a block diagram illustrating a portion of a data packet that is communicated between an RF transmitter and a receiver in the embodiment of FIG. 4A.

Reference is now made to FIG. 4B which describes the communication of data between the transmitter 126 and the receiver/telephone interface 129. Again, this transmission of data occurs across an RF link 173. In a preferred embodiment, the receiver/telephone interface 129 is disposed internally and in connection with a public, pay-type telephone 180. The particular format and protocol of data transmitted from the transmitter 126 may be as described in co-pending U.S. patent application Ser. No. 09/102,178, filed on Jun. 22, 1998. In this regard, the packet of data communicated across the RF link 173 may include certain synchronization bits, certain error detection and correction bits, and an encoded data word. With regard to the present invention, the encoded data word will preferably convey the status of all the sensors 132a, 132b, and 132c a the ATM location. A computer at the central system 118 may be configured to decode the encoded data word to ascertain the precise value and status of each of the various sensors.

Figure 5:
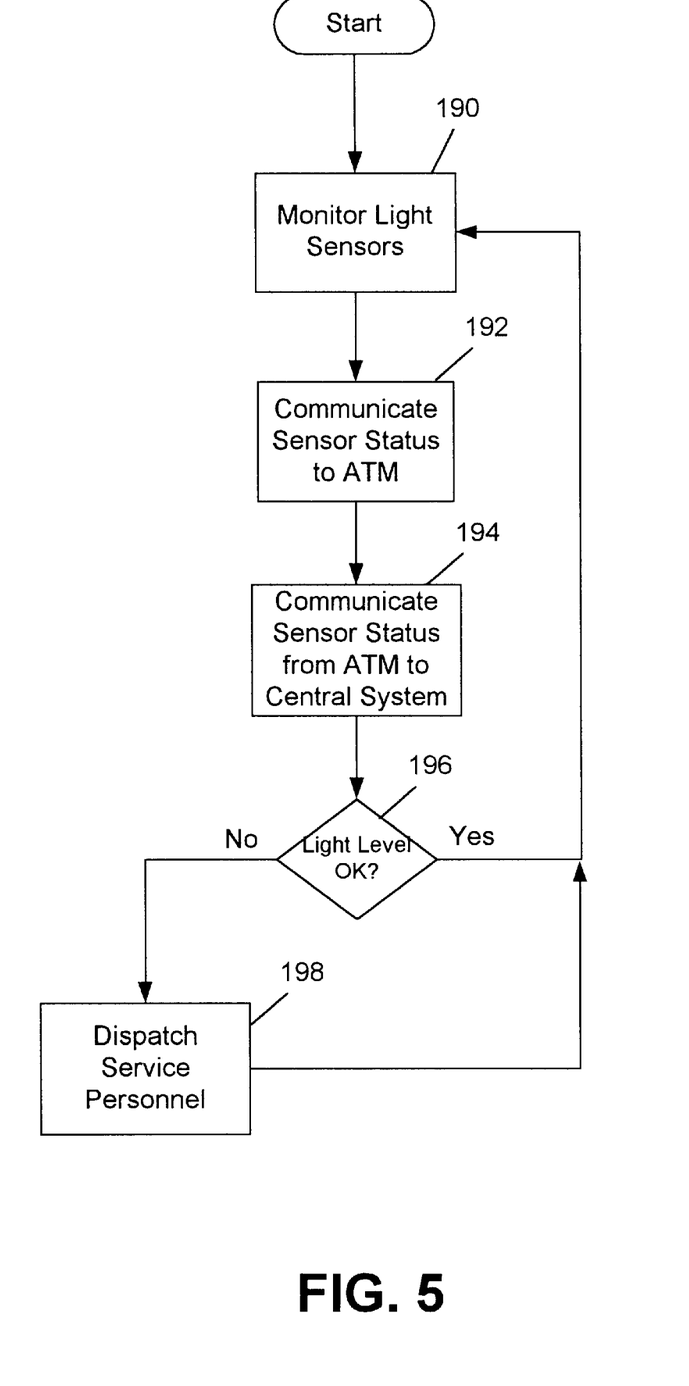
FIG. 5 is a flowchart illustrating a top-level functional operation of an embodiment of the present invention.

Reference is now made to FIG. 5 which is a flow chart that illustrates the top level operation of a system constructed in accordance with the present invention. In this regard, the system continually monitors light sensors which are configured to detect either a quantization of lighting at a particular location around an ATM device, or, alternatively, to detect whether or not the lighting conditions at a given location exceed certain specified threshold values (step 190). The status of the light sensors is then communicated to the ATM (step 192). The ATM then communicates this sensor status to a central system (step 194). In this regard, this communication step may comprise communication across a cellular link, direct line communication from a telephone interface provided at the ATM, or alternatively an intermediate communication via an RF link to a nearby receiver that then further communicates the data via the PSTN to a central system. If the central system deems that the light level sensed at the various lighting sensors is adequate (i.e., meets or exceeds specification) then it returns to step 190 where it continues the monitoring of a light level sensors. If, however, the central system determines that the light level at the various lighting sensors is inadequate or below specifications, then it may dispatch service personnel to correct the faulted lighted conditions to bring the lighting around the ATM device back up to the specifications, and therefore reduce the possibility of theft or other crime at the ATM site.

Having described various embodiments of the present invention, it will be appreciated that the ATM device is not a limitation on the invention, but simply defines an environment for the preferred embodiment. Accordingly, the concepts and teachings of the invention as described above may be realized in an identical system surrounding some device other than an ATM. It has been illustrated as being disposed within an ATM device purely as a matter of convenience, and should not be viewed as limiting on the invention. Accordingly, additional alternative embodiments of the present invention are set forth in FIGS. 6, and 8. Further, in these additional embodiments, it has been chosen to illustrate the light sensor units in a differing fashion.

Figure 6:
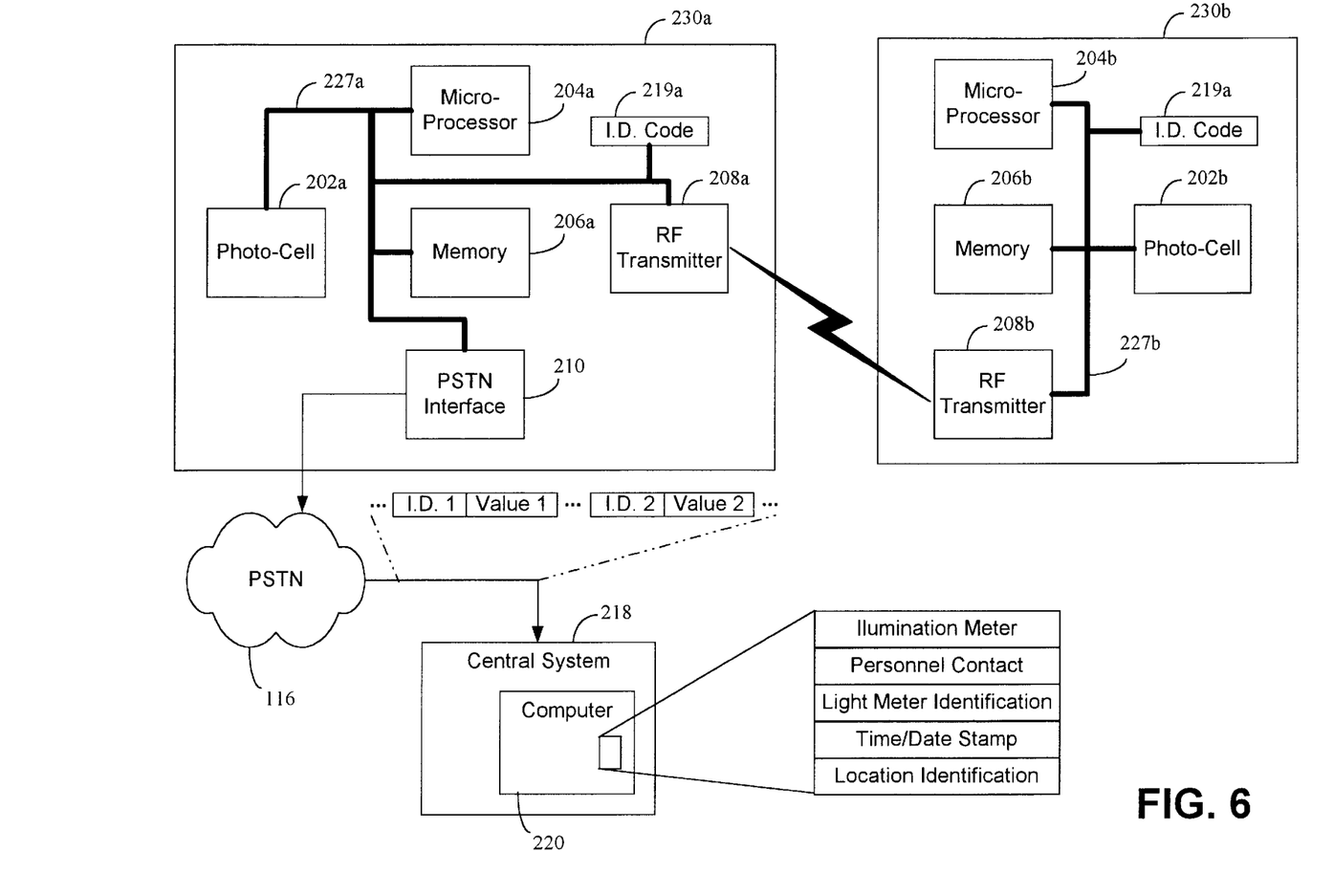
FIG. 6 is a block diagram of an alternative embodiment of a system constructed in accordance with the present invention.

Reference is made to FIG. 6 to illustrate one such additional embodiment. In this regard, the light sensors as depicted in the previous embodiments, are replaced with light meter gauges 230a and 230b. As opposed to the passive light sensor components previously described, the light meter gauges 230a and 230b are active components, and indeed are devices that contain onboard intelligence. In this regard, each light meter gauge includes a light sensor 202a (preferably a photo-cell), a processing unit 204a, a memory 206a, and an RF transmitter 208a. The processing unit 204a may be a microprocessor, a microcontroller, or other circuitry configured to control the operation of the light meter gauge 230a, or otherwise execute a sequence of instructions or operations.

The photo-cell 202a is a component that reacts to the intensity of light to generate an output electrical signal that may be supplied to the other components of the light meter gauge. A bus 227a has been illustrated in FIG. 6 as providing a communication link between the various devices on the light meter gauge 230a. It will be appreciated that, in practice, there will be a number of electrical signal wires interconnecting these devices, including conductors that make up a data bus, an address bus, and a variety of control and signaling conductors as well. Further, it will be appreciated that the output of the photo-cell 202a will typically be an analog value. Therefore, an analog to digital converter (not shown) would necessarily be included in the preferred embodiment in order to convert the analog data value output from the photo-cell 202a into a format suitable to be read by the microprocessor 204a and/or written to memory 206a. Each light meter gauge 230a and 230b can be configured by storing a program in memory 206a, 206b that controls the operation of the microprocessor 204a, 204b.

An important aspect of each of the light meter gauges 230a and 230b relates to the RF transmitter 208a and 208b. These transmitters are the mechanisms through which each of the plurality of light meter gauges 230a and 230b intercommunicate. Although the embodiment of FIG. 6 has been illustrated with just two light meter gauges 230a and 230b, it will be appreciated that, consistent with the concepts in teachings of the present invention, additional light meter gauges may be provided. Preferably, a first light meter gauge 230a will be configured as a master unit. This configuration may be defined by the program set up in memory 206a to control microprocessor 204a. Upon initialization, the master unit may be configured (in a variety of ways) to poll the various slave devices. In one embodiment, each light meter gauge may be configured with a unique identification code that allows the master unit to poll each individual slave device (using the identification codes as addresses) for its current operational status; namely, the status of the photo-cell 202 output. In an alternative configuration, each of the slave light meter gauges may be configured to communicate by a different RF frequency, and the master light meter gauge may be configured to poll across the various frequencies in order to ascertain the status of the individual slave devices. Fur purposes of the invention, the detailed implementation regarding the communication between the master unit and the various slave devices may be carried out in a variety of ways.

In addition to controlling the communications among the various light meter gauges, the master light meter gauge 230a is configured with a telecommunications interface. In the embodiment of FIG. 6, the telecommunications interface is a PSTN interface 210 that allows the master light meter gauge 230a to communicate with the PSTN 116 via, for example, a standard telephone line hookup.

In operation, the master light meter gauge 230a collects the data from the various slave light meter gauges and relays that information to the central system 218 via the telecommunications interface. This relay of information may be implemented in a variety of manners. In one configuration, the master unit may periodically relay status information of all of the light meter gauges 230a and 230b. As previously mentioned, each light meter gauge may be configured with a unique identification code 219a and 219b, which may be read by the microprocessor 204a and 204b for communication via the RF transmitters 208b of the various slave light meter gauges to the RF transmitter 208a of the master light meter gauge. This information may be assembled in a data packet that, in addition to synchronization, error detection and correction, and other data, may be formatted and sent out over a link established through the PSTN 116. In this regard, each data packet may include an identification code of each light meter gauge along with a data value associated with each identification code. The associated data values may reflect the status of the light meter gauge 230a and 230b, including the intensity value output from the photo-cell 202a and 202b. In an alternative configuration, and to allow for shorter packet transmissions, the master light meter gauge 230a may be configured to dial up the central system 218 and send out a short packet of data. This short packet of data may simply be a command that indicates a "ok" or an "all clear" message that informs the central system 218 that all light meter gauges at the given location defined by the master unit are in proper working order, and are receiving light at or above a specified intensity level, and therefore no service needs are required. If, however, the light intensity received at any light meter gauge falls below the specified level, then the master unit may configure the message packet to identify the specific light meter gauge (by its identification code) that is below specification, and/or its illumination level.

At the central system 218, it is contemplated that a computer system 220 may be provided to automatically receive incoming calls from the master light meter gauge 230a and interpret the data packet to respond in an automated fashion. FIG. 6 illustrates various factors or data fields or objects that the computer 220 may utilize during operation. Items like a time/date stamp, a location identification, a light meter identification, personnel contact, and other data values or objects may be maintained in records at the central system 218. The location identification may identify a given area that is monitored by a plurality of light meter gauges. The light meter identification may be a data value that identifies an identification code for specific light meter gauges at a given location. An illumination meter data value may simply be the status value (i.e., photo-cell intensity value) that is associated with a given light meter gauge identification code. As previously mentioned, this value may represent the intensity of light incident upon a particular light meter gauge. This value may be compared against a time/date stamp to determine whether, at any given time, the light meter intensity meets or exceeds a predefined threshold value. Also, a personnel contact data field may be provided. Assuming the central station 218 monitors or receives status information from a variety of monitoring systems dispersed at different geographic regions, the personnel contact may differ. For example, if a failure is detected in a light metering system at a first location, then a first personnel contact may be identified, whereas if a different light metering system failure at a geographically distinct location, a second personnel contact (i.e., service person) may be identified. Likewise, if other sensors are provided (e.g., sensors for detecting failure of a security camera), then a third service personnel may be contacted.

The computer 220 may be configured to automatically prompt the service personnel as by e-mail, paging, or otherwise to notify them of the problem and the location of the problem to be corrected.

Figure 7:
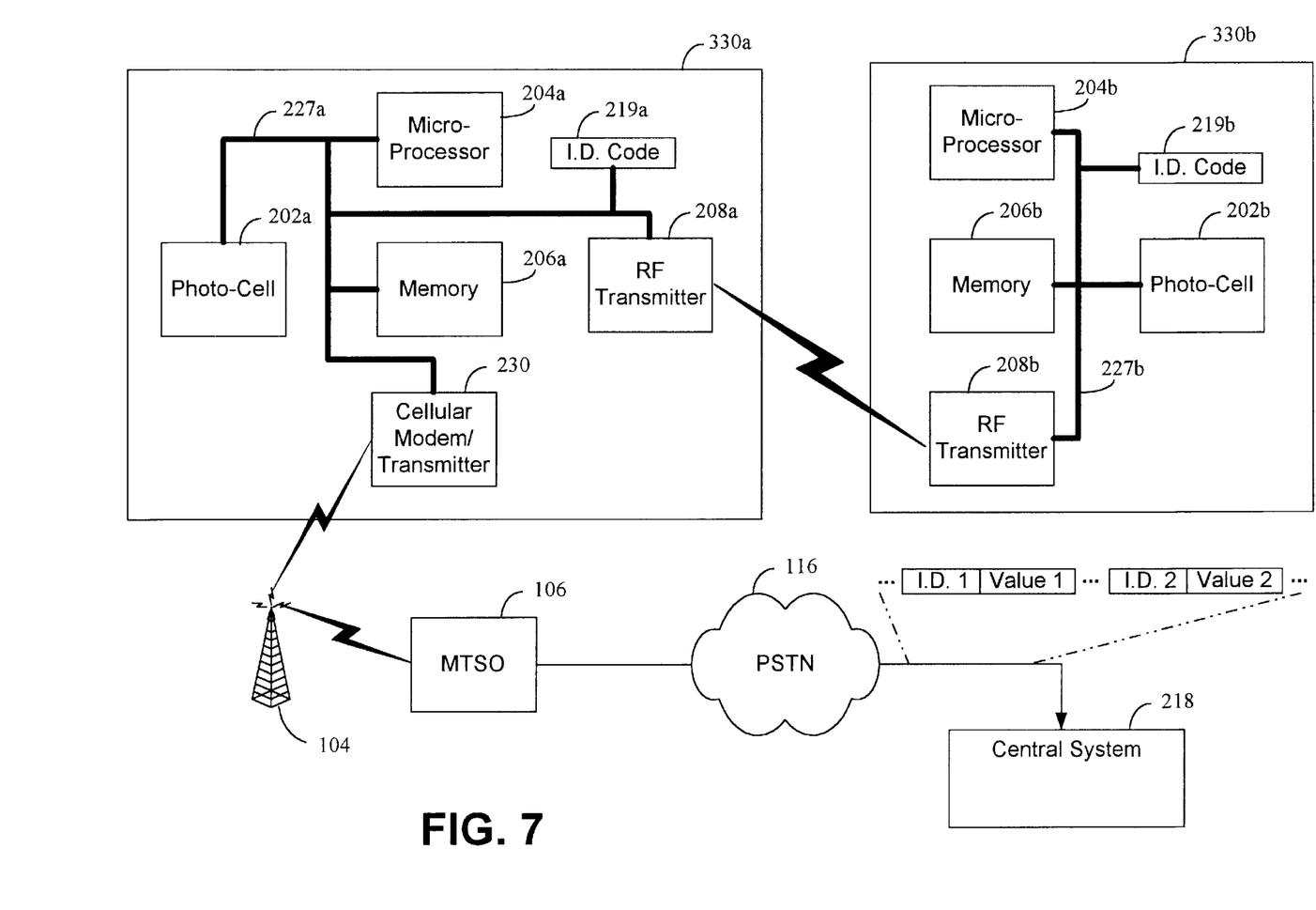
FIG. 7 is a block diagram of an alternative embodiment of a system constructed in accordance with the present invention.

Reference is now made to FIG. 7, which illustrates a similar, but slightly different embodiment. In this embodiment, the telecommunications interface is a cellular transmitter 230. Consistent with the invention, the cellular transmitter may include a modem and therefore communicate via cellular modem link. Rather than communicating immediately through the PSTN, the cellular link provided by interface 230 communicates via cell site 204 and MTSO 106 in a manner similar to that described in connection with FIG. 1. The various other aspects of FIG. 7 may be configured as described in connection with FIG. 6.

Figure 8:
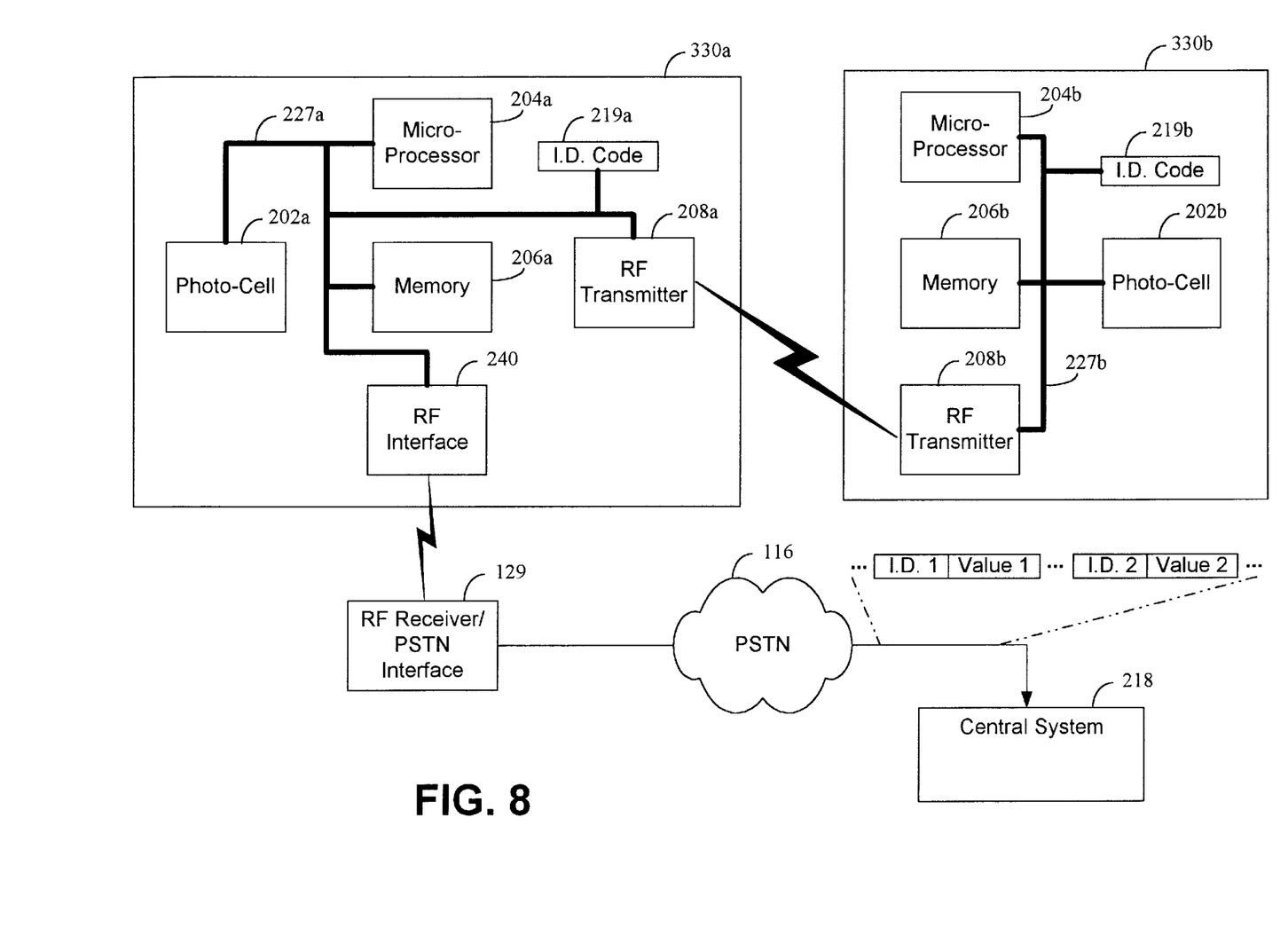
FIG. 8 is a block diagram of an alternative embodiment of a system constructed in accordance with the present invention.

Reference is now made to FIG. 8 which shows yet another embodiment of the present invention, similar to those of FIGS. 6 and 7. Indeed, the embodiment illustrated may be viewed as operating in the same fashion as that described above, with the exception that the telecommunications interface is an RF interface 240. In this embodiment, the master light gauge 230a may communicate via RF telecommunications link to a nearby RF receiver 129, which includes a PSTN interface for communication with the PSTN 116. As previously described, the RF receiver may be a RF receiver that is disposed in a nearby pay-type telephone.

Figure 9:
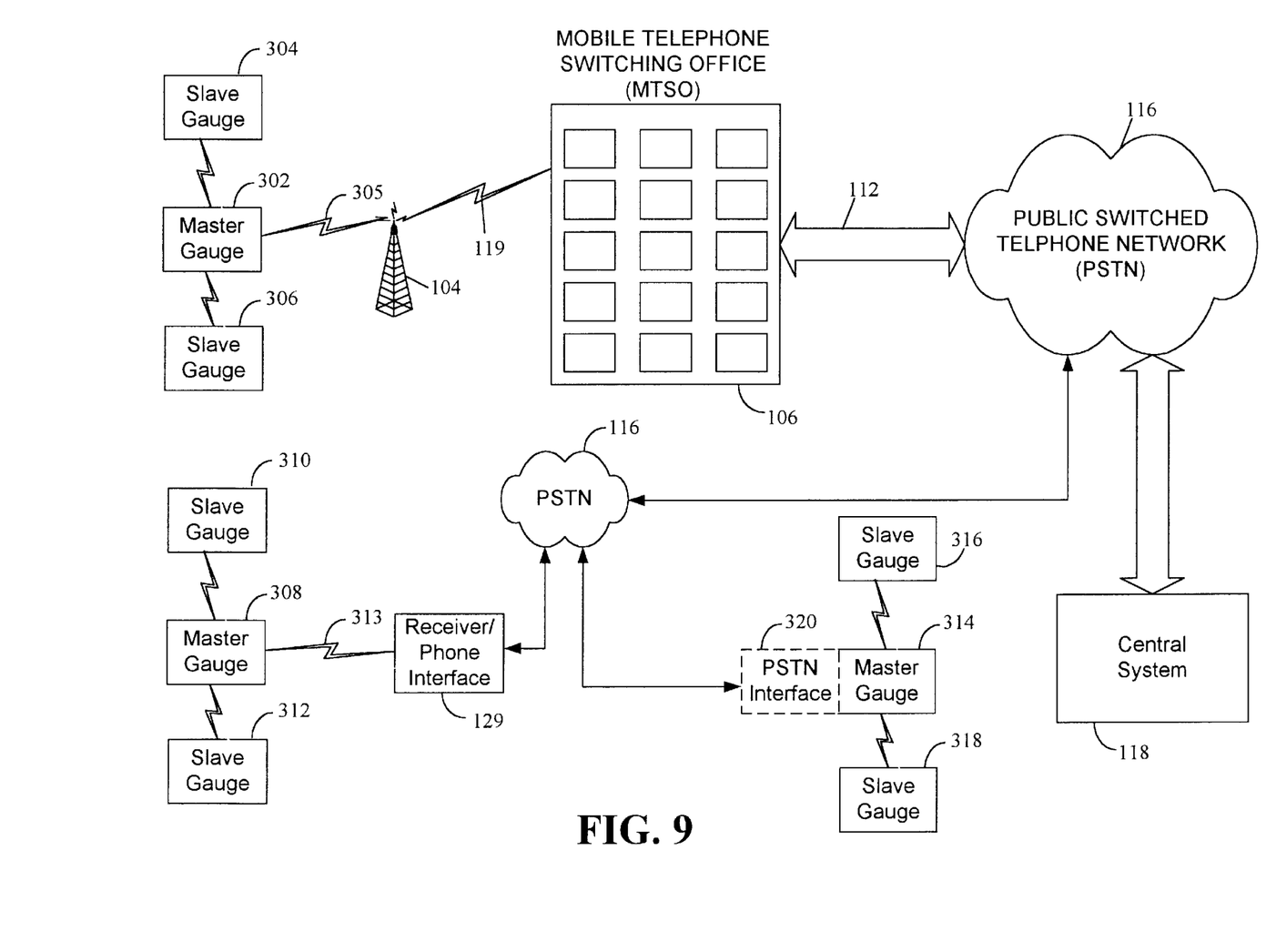
FIG. 9 is a system level diagram like that of FIG. 1, illustrating a system constructed from the embodiments illustrated in FIGS. 6, 7, and 8.

FIG. 9 illustrates an embodiment similar to FIG. 1, but reflecting the embodiments of FIGS. 6, 7, and 8. Therefore, an overall system may comprise a variety of configurations of master/slave gauges depending upon the location being reported from. Therefore, a first master gauge 302 may be provided to communicate with a plurality of slave gauges 304 and 306 via RF transmission links as described above. This first master gauge 302 may be configured to communicate with a central system 118 via a cellular link 305 to a cell site 104, MTSO 106, and PSTN 116. A second master gauge 308 may be configured to communicate with a plurality of slave gauges 310 and 312 and communicate via RF link 313 to a nearby RF receiver 129 which is interfaced to a standard PSTN telephone line. In yet another location, a master gauge 314 may be configured to communicate via RF links with a plurality of slave gauges 316 and 318, wherein the master gauge 314 includes a PSTN interface 320 to communicate via the PSTN 116 to the central system 118.

By way of clarification, it will be appreciated that the light meter gauges (e.g., 230a and 230b illustrated in FIGS. 6, 7, and 8, may be constructed in a physically similar manner. That is, from a mass-manufactured standpoint, all of the light meter gauges 230a and 230b may be designed to include the telecommunications interface (e.g., cellular transmitter, PSTN interface, RF interface, etc.). However, upon configuration, one of these units may be configured to utilize that interface as a master unit, while the remaining units are configured to operate as slave devices, and therefore not use the interface. It will be appreciated, of course, that this is purely a matter of design choice and economy in manufacture. It will be further appreciated that some of functionality described above may be implemented in the master light meter gauge, or alternatively, may be implemented at the central system. For example, the master light meter gauge may include an onboard clock, whereby it may compare the magnitude of the output from the light sensor (photo-cell) to a given time of day reading, to determine whether the unit is receiving an adequate amount of light. Alternatively, the master unit may be configured simply to periodically transmit this data to the central system, which may be configured to maintain a centralized clock/time of day device.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A system for monitoring the level of light in an area comprising:

a plurality of light gauges disposed in varying locations around the area, wherein each light gauge includes a light sensor, a central processing unit, a memory, and a radio frequency (RF) transmitter disposed to intercommunicate;

a first light gauge of the plurality of the light gauges being configured as a master light gauge and the remainder of the plurality of light gauges being configured as slave light gauges, wherein the RF transmitter of the master light gauge may communicate with the RF transmitters of the slave gauges; and a telecommunications interface disposed in communication with the central processing unit of the master light gauge, the telecommunications interface being configured to communicate information relating to an output value of the light sensors of the plurality of light gauges to a central station.

2. The system as defined in claim 1, wherein the telecommunications interface includes a cellular transmitter for communicating data via a cellular link.

3. The system as defined in claim 1, wherein the telecommunications interface includes a PSTN interface for interfacing with a PSTN.

4. The system as defined in claim 1, wherein each of the plurality of light gauges includes an identification code that uniquely identifies that light gauge.

5. The system as defined in claim 4, wherein each of the slave gauges is configured to communicate its identification code to the master unit, and the master unit is configured to communicate each of the slave identification codes to the central system along with an associated value for the light sensors of each slave light gauge.

6. The system as defined in claim 1, wherein each of the slave gauges is configured to communicate to the master unit via a discrete RF frequency, and the master unit is configured to identify each of the slave gauges by its discrete RF frequency.

7. The system as defined in claim 1, wherein each slave light gauge is further configured to communicate additional data to the master light gauge.

8. The system as defined in claim 7, wherein the master light gauge is configured to communicate all information communicated to it from each slave light gauge to a central system via the telecommunication interface.

9. The system as defined in claim 7, wherein the master light gauge is configured to communicate a single "ok" command to the central system if all slave light gauges reading light at or above a specified level, the master light gauge being further configured to send specific slave light gauge data to the central system only for slave light gauges that communicate a light level reading that is below the specified level.

10. A system for monitoring the level of light surrounding an automatic teller machine (ATM) comprising:

a plurality of light sensors disposed in varying locations around the ATM;

a circuit within the ATM in- communication with the sensors, the circuit having a central processing unit and a memory, the memory being configured to store identification information of the light sensors;

a radio frequency (RF) transmitter disposed within the ATM configured to communicate the status of the sensors to a remotely located receiver; and a receiver interfaced to a telephone line forming part of a public switched telephone network (PSTN), the receiver configured to receive the status of the sensors communicated from the RF transmitter, the receiver further configured to communicate the status information to a remote system via the PSTN.

11. The system as defined in claim 10, wherein the RF transmitter is configured to communicate a message having an encoded data segment that identifies the status of the light sensors.

12. The system as defined in claim 10, further including at least one camera sensor configured to determine the operational condition of a security camera.

13. The system as defined in claim 11, wherein the the message includes the identification information of the light sensors such that the status of the light sensors correlates to the identification information.

14. The system as defined in 10, wherein a first light sensor of the plurality of the light sensors is adapted as a master light gauge and the remainder of the plurality of light sensors are adapted as slave light gauges, and wherein the master light gauge is configured to communicate with the slave light gauges.

15. The system as defined in 10, further including a time of day clock, wherein the system is configured to operate and detect below specification lighting conditions only within a window of time as determined by the time of day clock.

16. The system as defined in 15, wherein the time of day clock is located at the remote system.

17. A system for monitoring the level of light surrounding an automatic teller machine (ATM) comprising:

a plurality of light sensors disposed in varying locations around the ATM;

a circuit within the ATM in communication with the sensors, the circuit having a central processing unit and a memory, the memory being configured to store identification information of the light sensors; and a cellular transmitter disposed within ATM for communicating the status of the sensors to a remote cell site, the cellular transmitter being disposed in communication with the circuit.

18. The system as defined in 17, further including at least one camera sensor configured to determine the operational condition of a security camera.

19. The system as defined in 17, wherein a first light sensor of the plurality of the light sensors is adapted as a master light gauge and the remainder of the plurality of light sensors are adapted as slave light gauges, and wherein the master light gauge is configured to communicate with the slave light gauges.

20. A system for monitoring the level of light surrounding an automated teller machine (ATM) comprising:

a plurality of light sensors disposed in varying locations around the ATM;

a circuit within the ATM in communication with the sensors; and a radio frequency (RF) transceiver disposed within the ATM configured to communicate the status of the sensors to a second, remotely located transceiver;

the second transceiver interfaced to a telephone line forming part of a public switched telephone network (PSTN), the second transceiver configured to receive a request via the PSTN initiated from a remotely located system to check the status of the light sensors and relay that request to the RF transceiver disposed within the ATM, the second transceiver further configured to receive the status of the sensors communicated from the RF transceiver, the second transceiver further configured to communicate the status information to a remote system via the PSTN; and further including at least one camera sensor configured to determine the operational condition of a security camera.

* * * * *